Figure 1:
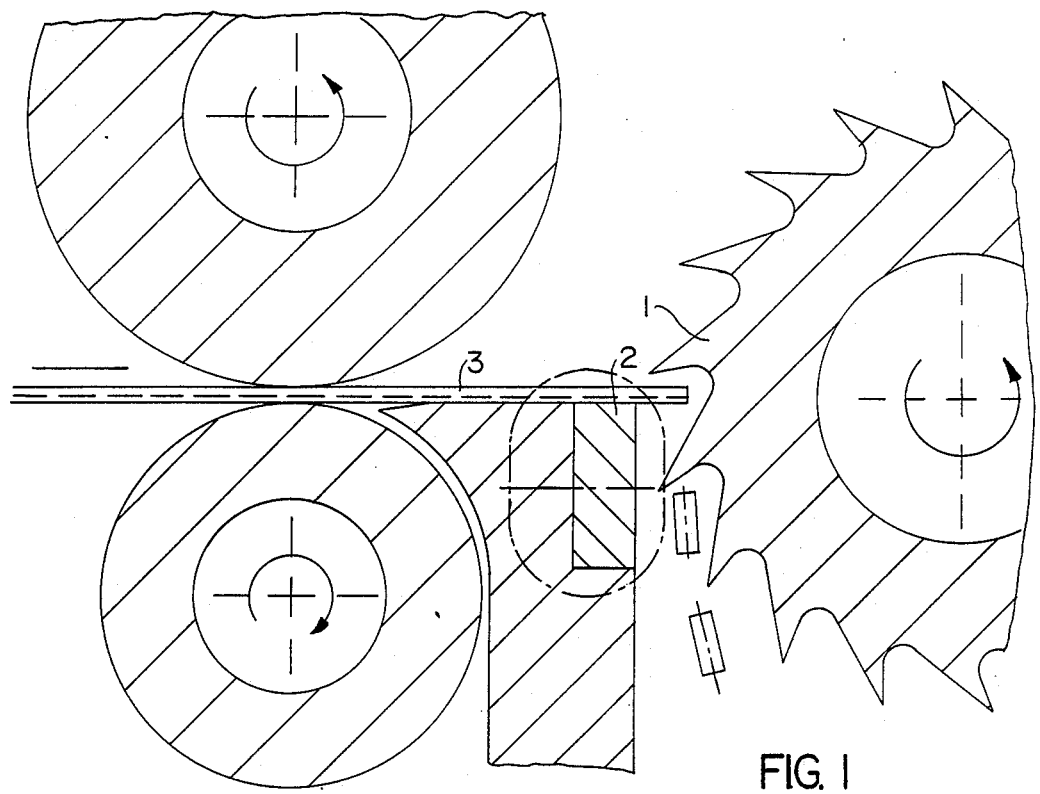

United States Patent [19]

Reinhard

[11] Patent Number: 4,960,020
[45] Date of Patent: Oct. 2, 1990

[54] STRAND CUTTER WITH BED KNIFE THAT CAN BE REPLACED DURING OPERATION

[76] Inventor: Michael Reinhard, Waldstr. 9, D-6117 Schaafheim, Fed. Rep. of Germany

[21] Appl. No.: 290,103
[22] PCT Filed: Mar. 16, 1988
[86] PCT No.: PCT/DE88/00159
§ 371 Date: Nov. 16, 1988
§ 102(e) Date: Nov. 16, 1988
[87] PCT Pub. No.: WO88/06959
PCT Pub. Date: Sep. 22, 1988

[30] Foreign Application Priority Data

Mar. 16, 1987 [DE] Fed. Rep. of Germany ....... 3708453

[51] Int. Cl.$^5$ .............................................. B26D 7/08
[52] U.S. Cl. .......................................... 83/34; 83/349; 83/906; 83/950
[58] Field of Search ............. 83/349, 663, 906, 926 H, 83/408, 34

[56] References Cited

U.S. PATENT DOCUMENTS

| | | |
|---|---|---|
| 3,837,586 | 9/1974 | Perschbacher et al. . |
| 3,852,144 | 12/1974 | Parry ................................ 83/926 H |
| 4,208,931 | 6/1980 | Collins . |
| 4,474,336 | 10/1984 | Fleming ................................ 83/349 |
| 4,590,978 | 5/1986 | Kintz et al. ............................ 83/906 |
| 4,693,157 | 9/1987 | Looser ................................ 83/926 H |

FOREIGN PATENT DOCUMENTS 3620015 11/1986 Fed. Rep. of Germany .
2520593 8/1983 France .

*Primary Examiner*—Douglas D. Watts
*Assistant Examiner*—Scott A. Smith
*Attorney, Agent, or Firm*—Banner, Birch, McKie & Beckett

[57] ABSTRACT

The invention relates to a strand cutter, more particularly for granulating plastic materials. It has for its object the provision of a strand cutter in which the fixed bed knife can be replaced with a new bed knife without interrupting the granulating process. This is to prevent the deterioration of the cutting quality, and thereby the shape of the granules, due to the progressive wear of the bed knife or to prevent down-times during the changing of the knife. This object is achieved according to the invention by keeping the bed knife (2) in a guide free from play at right angles to the delivery direction of the strands (3) and moving the bed knife (2) forward at a low feed rate or replacing it with a new bed knife (2') during the granulating process.

25 Claims, 2 Drawing Sheets

STRAND CUTTER WITH BED KNIFE THAT CAN BE REPLACED DURING OPERATION

The invention relates to a strand cutter, more particularly for granulating plastic materials.

Strand cutters are machines with which materials or stream of materials, in the present case strands, are cut into short segments. As a rule, when manufacturing plastic molding compounds, they are used for converting the plastic, after synthesis and compounding, into a form in which it can be simply divided into portions and packed up and reprocessed by almost any current machine.

Unexamined West German Patent Applications No. 25 12 899, 26 46 309, and 28 09 680 disclose granulators used to carry out granulating plastic materials in so-called hot die-face cutting. With this method, the plastic melt is extruded in water through a breaker plate. The thus formed strands ar cut by knives rotating at the breaker plate. These granulators are primarily employed when granulating bulk plastic materials and provide the throughput capacity necessary for this purpose. High-grade plastic materials, so-called engineering plastics, which often tend to form filaments, cannot be satisfactorily granulated in this manner. Strand cutters for such applications have been disclosed in Unexamined West German Patent Applications (DE-OS) No. 27 24 464 and DE-OS No. 29 01 018, the said strand cutters being preferably used with somewhat low throughput capacities and for filled and reinforced plastic materials. The melts are extruded through multi-orifice dies into a water bath or flowing water, and after passing through a cooling section the strands forming upon cooling are fed into the granulatingunit proper in which they are cut into granules by means of a cutting rotor with a plurality of knives on a fixed bed knife.

It became evident, however, that the conventional mechanical concepts for strand cutters have a serious disadvantage: When granulating filled, reinforced and often even corrosive plastic materials, the knife edges are subject to considerable wear This is particularly true if the fillers or reinforcing materials are very hard and a corrosive component is added for abrasive stress. Contingent upon the fact that the bed knife, in comparison with the knives on the cutting rotor, is in contact in each cut, its wear is particularly high. Even after a few hours of operation, the cutting quality and thereby the shape of the granules can become so poor that it is necessary to replace the worn bed knife. Continuous processes or processes extending over a rather long period must be interrupted for this purpose; this often entails technical problems and economic losses.

The invention has as its object the manufacture of a strand cutter in which the fixed bed knife can be changed without interrupting the granulating process.

The object is achieved according to the invention by keeping the bed knife free from play in a guide at right angles to the strand direction and moving the bed knife forward at a relatively low feed rate or replacing it during the granulating process. The feed rate must be so low that the position of strands in the granulator is not affected. The fixing of the bed knife according to one embodiment has the advantage that given an appropriate design the guide and the attendant bed-knife require only a small space. This makes it possible to rebuild existing granulators. To do this, the guide must be screwed in instead of the bed-knife. A prerequisite is for the existing design to offer lateral room for inserting and pushing forward the the bed-knife. The fixing of the bed knife according to a further embodiment enables one to vary the frictional forces as required, e.g., when securing the bed knife in position or when moving it forward.

If a very long bed-knife is used, there is the advantage that there are no abutting surfaces in the region where the strands are granulated. If a very long knife cannot be used for reasons of space, a new knife is inserted from the side of the granulator into the guide and brought by means of a feeding unit into the area where the strands are cut. At the same time, the old, worn bed knife is displaced and can be removed on the other side of the granulator. This process can be automated according to a further embodiment with a magazine and an appropriate feeding unit and the presence of a functional bed knife can be assured for a rather long operating time. The continuous feed motion of the bed knife according to a further embodiment has the advantage that the knife, when it is replaced, is worn uniformly along the entire width, and this results in high utilization. However, the bed knife is not uniformly worn during engagement. Wear increases with increasing distance from the side from which the bed knife is inserted, because the residence time is also correspondingly higher under stress.

With a noncontinuous feed motion, i.e., when moving forward or when being replaced at regular intervals, the cutting edge areas on which the strand is cut are highly stressed, whereas the intervening spaces remain largely unstressed. However, the areas on which the strands are cut are uniformly worn over the entire width of the engagement. The use of the bed knife can be increased by moving it forward during an interval for a length corresponding to the distance between two adjacent strands.

Likewise, optimization of bed knife utilization is achieved with the granulator according to a further embodiment. Wear can be measured by inductive, capacitive, or optical measuring techniques or by ultrasonic testing. If, because of the design, the wear cannot be measured directly in the area of the granulator where the strands are cut, there is the option of measuring it externally, when the bed knife is being replaced or moved further. Another option is to move the bed knife or the stressed area for a short time at a faster feed rate out of the granulation area to measure the wear, and to push it back again to the starting position by means of a suitable device.

Figure 1A:
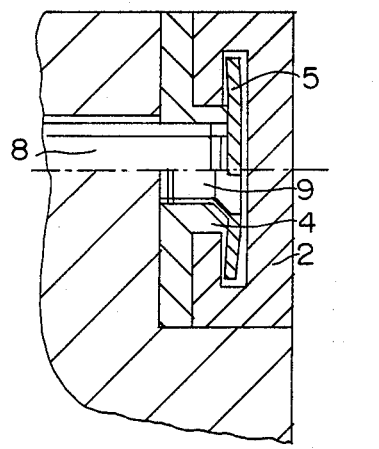
Figure 1B:
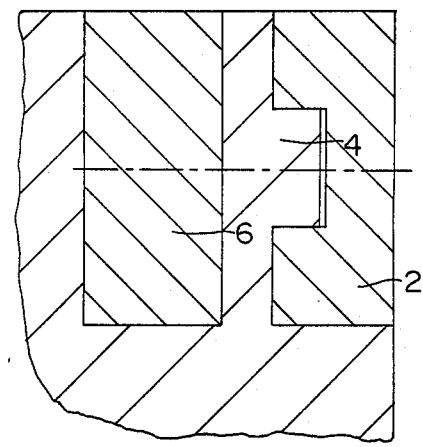
Figure 2:
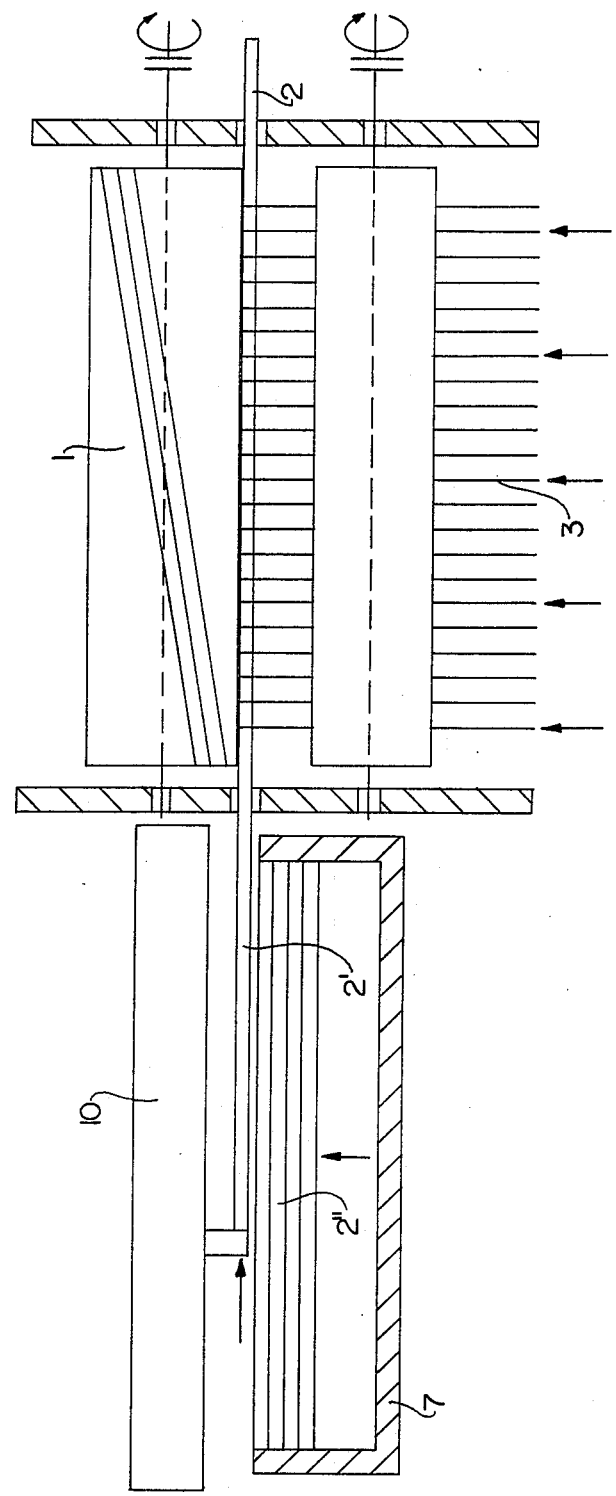

The inventive concept will now be discussed with reference to practical embodiments. The diagrams (not to scale) show the following:

FIG. 1 a section through a strand cutter,

FIG. 1a a novel bed knife guide with friction fit through spring force,

FIG. 1b a novel bed knife guide with friction fit through magnetic attraction,

FIG. 2 a plan view of a novel strand cutter.

FIG. 1a shows the screwing together of the guide (4) with the frame of the granulator by means of screws (8). The guide itself (4) follows the principle of a T-slot guide, except that the transverse member of the "T" consists of a steel-band spring (5), which is downwardly arched when unstressed. It is connected to the bar by means of countersunk screws (9) so as to form an upper and lower channel therebetween. The bed knife includes upper and lower overhanging portions which fit within the channels. When the appropriately profiled bed knife (2) is inserted, the spring force produces the friction fit necessary for the backlash-free guidance or fixing. Another option for guiding and fixing the bed knife (2) is shown in FIG. 1b. The guiding is carried out by a bar (4) having a forward projection. The bed knife includes a corresponding indention which fits around the projection. The forces for fixing the bed knife (2) are generated by means of an electromagnet (6) inserted in a slot in bar (4) opposite from the projection.

FIG. 2 illustrates the replacement procedure of a bed knife (2). A new bed knife is put on by a magazine (7), inserted into the guide by means of suitable devices, and then brought by means of a feeding device (10) into the area where strands (3) are cut. At the same time, the old and worn bed knife (2) is dislodged and can be removed on the other side of the granulator.

REFERENCE NUMERALS (1) Cutting rotor
(2) Bed knife
(2') New succeedidng bed knife
(2") New bed knife held in readiness
(3) Strands
(4) Guide (bar)
(5) Spring
(6) Magnet
(7) magazine
(8) Screws
(9) Countersunk screws
(10) Feeding device

I claim:

1. A strand cutter comprising:
   a cutting rotor including a plurality of cutting knives extending therefrom;
   a linear bed knife disposed adjacent said rotor;
   strand feeding means for feeding the strands in a first direction such that said strands move in a plane towards said cutting rotor and said bed knife, rotation of said rotor cutting said strands at said bed knife;
   guide means for guiding said bed knife such that said bed knife may be moved in a second direction perpendicular to said first direction and parallel to said plane; and
   bed knife feeding means for non-reciprocally feeding said bed knife in said second direction.

2. The strand cutter recited in claim 1, said guide means fixing the radial spacing of said bed knife with respect to said cutting rotor and fixing the distance between said bed knife and said plane.

3. The strand cutter recited in claim 2, said bed knife feeding means continuously feeding said bed knife to said guide means while said strands are cut.

4. The strand cutter recited in claim 3, said bed knife continuously fed at a low feed rate.

5. The strand cutter recited in claim 2, said bed knife feeding means comprising storing means for storing a plurality of bed knives, said bed knives fed continuously from said storing means to said guide means during cutting of said strands such that each successive bed knife dislodges and replaces the preceding bed knife from said guide means.

6. The strand cutter recited in claim 2, said strands comprising a plastic material.

7. The strand cutter recited in claim 1, said bed knife feeding means continuously feeding said bed knife to said guide means while said strands are cut.

8. The strand cutter recited in claim 7, said bed knife continuously fed at a low feed rate.

9. The strand cutter recited in claim 1, said guide means including a T-slot guide formed by a bar and a steel band-spring attached thereto so as to form at least one channel therebetween, said bed knife having at least one overhanging portion fitting in said at least one channel.

10. The strand cutter recited in claim 1, said guide means including a projection extending therefrom and an electromagnet disposed behind said projection, said bed knife having an indention fitting around said projection, said magnet holding said bed knife on said projection.

11. The strand cutter recited in claim 1, said bed knife feeding means comprising storing means for storing a plurality of bed knives, said bed knives fed continuously from said storing means to said guide means during cutting of said strands such that each successive bed knife dislodges and replaces the preceding bed knife from said guide means.

12. The strand cutter recited in claim 1, said strands disposed across said strand feeding means for a predetermined width in said second direction, said bed knife having a length greater than said width.

13. The strand cutter recited in claim 1, said strands disposed across said strand feeding means such that each strand is spaced from an adjacent strand, said bed knife feeding means non-continuously feeding said bed knife such that said bed knife incrementally moves a distance equal to the spacing between adjacent strands.

14. The strand cutter recited in claim 13, said strands comprising a plastic material.

15. The strand cutter recited in claim 1, said strands comprising a plastic material.

16. A method for cutting a plurality of strands with a strand cutter comprising a cutting rotor having a plurality of cutting knives extending therefrom and a linear bed knife disposed adjacent said rotor, rotation of said rotor cutting said strands at said bed knife, said method comprising the steps of:
   feeding the strands in a first direction such that said strands move in a plane towards the cutting rotor and the bed knife; and
   non-reciprocally feeding said bed knife in a second direction perpendicular to said first direction and parallel to said plane.

17. The method recited in claim 16 comprising the further step of fixing the radial spacing of the bed knife with respect to the cutting rotor and fixing the distance between the bed knife and the plane.

18. The method recited in claim 17, the bed knife continuously fed while said strands are cut.

19. The method recited in claim 18, the bed knife continuously fed at a low feed rate.

20. The method recited in claim 17, a successive bed knife fed continuously during cutting of the strands such that each successive bed knife dislodges and replaces the preceding bed knife.

21. The method recited in claim 16, the bed knife continuously fed while said strands are cut.

22. The method recited in claim 21, the bed knife continuously fed at a low feed rate.

23. The method recited in claim 16, a successive bed knife fed continuously during cutting of the strands such that each successive bed knife dislodges and replaces the preceding bed knife.

24. The method recited in claim 16 comprising the further step of disposing said strands so as to have a predetermined width in said second direction, the bed knife having a length greater than said width.

25. The method recited in claim 16 comprising the further steps of disposing the strands such that each strand is spaced from an adjacent strand, and non-continuously feeding the bed knife such that the bed knife incrementally moves a distance equal to the spacing between adjacent strands.

* * * * *